United States Patent [19]

Versteeg

[11] Patent Number: 4,842,220
[45] Date of Patent: Jun. 27, 1989

[54] APPARATUS FOR MOVING AN AIRCRAFT

[75] Inventor: Gijsbert Versteeg, Nunspeet, Netherlands

[73] Assignee: Aarding B.V., Nunspeet, Netherlands

[21] Appl. No.: 230,674

[22] Filed: Aug. 5, 1988

Related U.S. Application Data

[63] Continuation of Ser. No. 13,400, Feb. 11, 1987, abandoned.

[30] Foreign Application Priority Data

Feb. 12, 1986 [NL] Netherlands .................... 8600340

[51] Int. Cl.$^4$ .................... B64C 25/38; B64F 1/22
[52] U.S. Cl. .................... 244/50; 244/2; 180/6.48; 440/11
[58] Field of Search .................... 244/17.17, 50, 63, 2, 244/101; 180/9.26, 9.22, 904, 14.3, 6.7, 6.48; 440/11, 10, 12

[56] References Cited

U.S. PATENT DOCUMENTS

| 2,351,799 | 6/1944 | Austin | 244/2 |
| 2,852,317 | 9/1958 | Riemerschmid | 180/6.7 |
| 2,957,650 | 10/1960 | Horan et al. | 180/904 |
| 2,966,222 | 12/1960 | Lambert, Jr. | 180/904 |
| 3,929,204 | 12/1975 | Newell | 180/9.26 |
| 4,121,788 | 10/1978 | McMahon | 180/904 |
| 4,462,560 | 7/1984 | Earl | 244/110 E |
| 4,640,421 | 2/1987 | Mason | 180/9.26 |

FOREIGN PATENT DOCUMENTS 1388298  3/1975  United Kingdom .................. 440/11

Primary Examiner—Galen Barefoot
Attorney, Agent, or Firm—Lorusso & Loud

[57] ABSTRACT

An aircraft carrier (1) is provided that can be moved by the thrust of the aircraft (2) positioned on the carrier (1). The carrier (1) comprises a steering system that is powered by the nosewheel (9) of the aircraft (2).

11 Claims, 2 Drawing Sheets

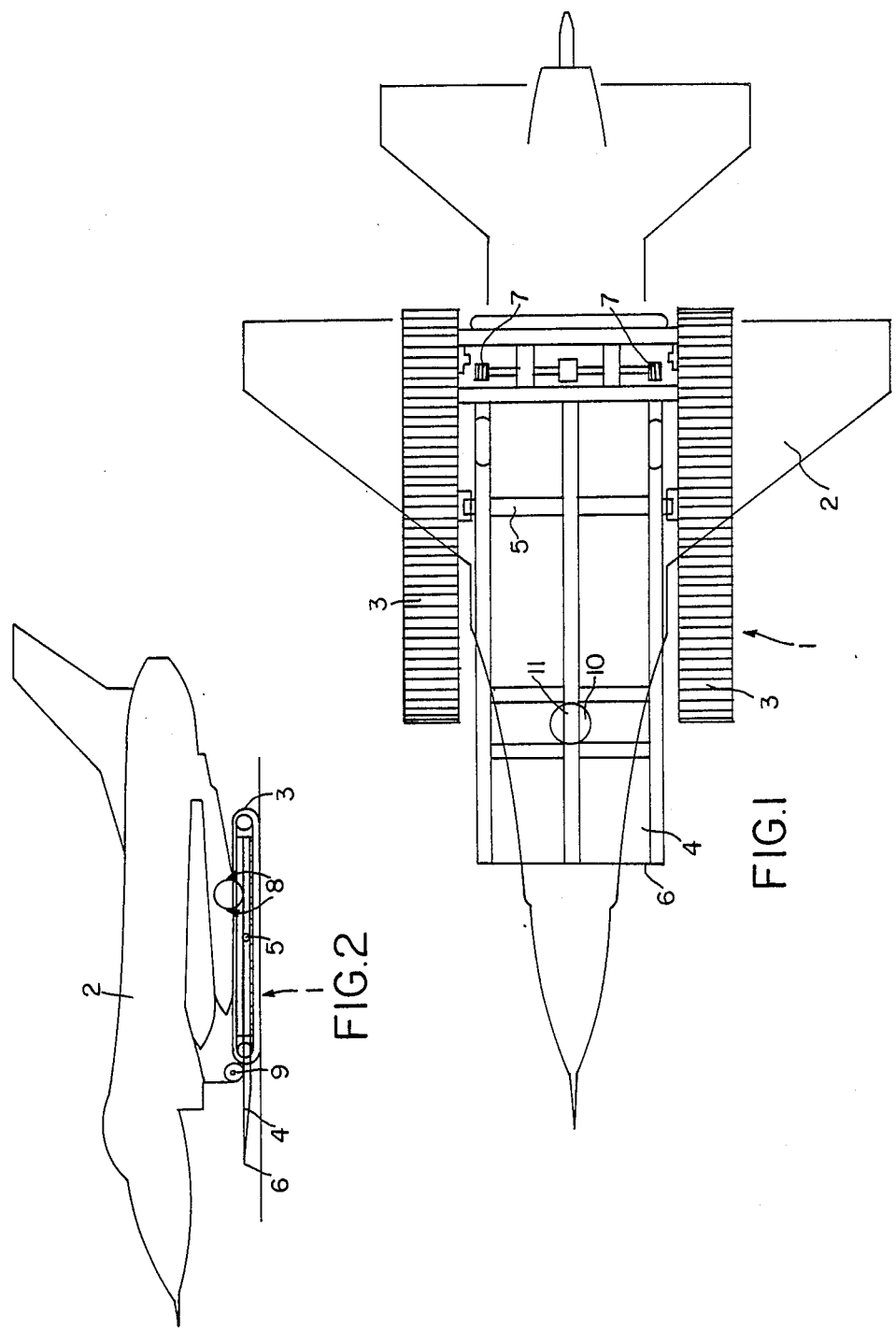

APPARATUS FOR MOVING AN AIRCRAFT

This is a continuation of co-pending application Ser. No. 013,400 filed on Feb. 11, 1987 now abandoned.

The invention relates to a mobile apparatus for moving an aircraft, said apparatus comprising propelling means.

A known apparatus of this type is provided by a vehicle comprising a towing device that very often is connected to the nosewheel of an aircraft to be moved.

This known apparatus is relatively expensive, not only in its purchase and maintenance, but also in its use, because this known apparatus needs a driver.

It is an object of the invention to provide an apparatus of the type mentioned before that solves these problems in a simple, but nevertheless effective way.

Therefore the apparatus according to the invention is characterized in that the apparatus comprises an aircraft carrier movable by the thrust of the aircraft.

With the apparatus according to the invention the aircraft is positioned entirely upon a carrier, that is moved by the thrust of the aircraft. Thus suffices a relatively simple construction, whereas for moving thereof no additional driver is needed.

According to a preferred embodiment the apparatus is steerable by the nosewheel of the aircraft positioned on the carrier.

In this way in an extremely easy way, namely by rotating the nosewheel of the aircraft, a steering of the apparatus is obtained, so that the apparatus according to the invention is entirely steerable from the cockpit of the aircraft positioned on the carrier, without the necessity of a special electric, electronic, pneumatic or hydraulic connection between the aircraft and the vehicle.

Advantageously the steering of the apparatus can be obtained by providing the apparatus with a steering means that is pivotable by the nosewheel between two extreme positions for controlling the r.p.m.-ratio between the propelling means positioned at opposite sides of the carrier. The change of the r.p.m.-ratio between the propelling means at the opposite sides of the carrier results in a curved track of the apparatus.

According to a further embodiment of the apparatus according to the invention the propelling means positioned at one side of the carrier and the propelling means positioned at the other side are connected to first and second hydraulic motor/pump assemblies, respectively, wherein one of said motor/pump assemblies has a power stroke settable by the stearing means and which is positioned in series with the other motor/pump assembly, so that a change of workstroke causes a change of the r.p.m.-ratio between both motor/pump assemblies and thus between the propelling means.

As a result the r.p.m.-ratio between the propelling means can be set in dependency with the nosewheel position.

According to a handy embodiment of the apparatus one of said motor/pump assemblies is connected to an auxiliary pump for pressurising a pressure vessel.

During the normal use of the apparatus the pressure vessel is pressurized, it being possible to drive several auxiliary means of the apparatus with said pressure vessel. Moreover it is possible then to move the apparatus over short distances, even if it does not carry an aircraft, by connecting the pressure vessel to an additional drive mechanism.

At the other hand it is advantageously if the apparatus comprises a compressed air vessel that can be connected to an additional pneumatic drive motor. Finally it is advantageously if the propelling means of the carrier comprises cater-pillars.

Due to this the apparatus according to the invention will be extremely fit to be used on rough, unimproved or by waractions damaged air fields. As a result of the large bearing surface of the cater-pillars the aircraft can move itself across surfaces, where this would not be possible without the apparatus according to the invention.

Hereafter the invention will be explained with reference to the drawing, in which an embodiment is illustrated.

FIG. 1 shows a schematical top plan view of an embodiment of the apparatus according to the invention;

FIG. 2 shows a side elevational view of the apparatus according to FIG. 1, and

Figure 3:
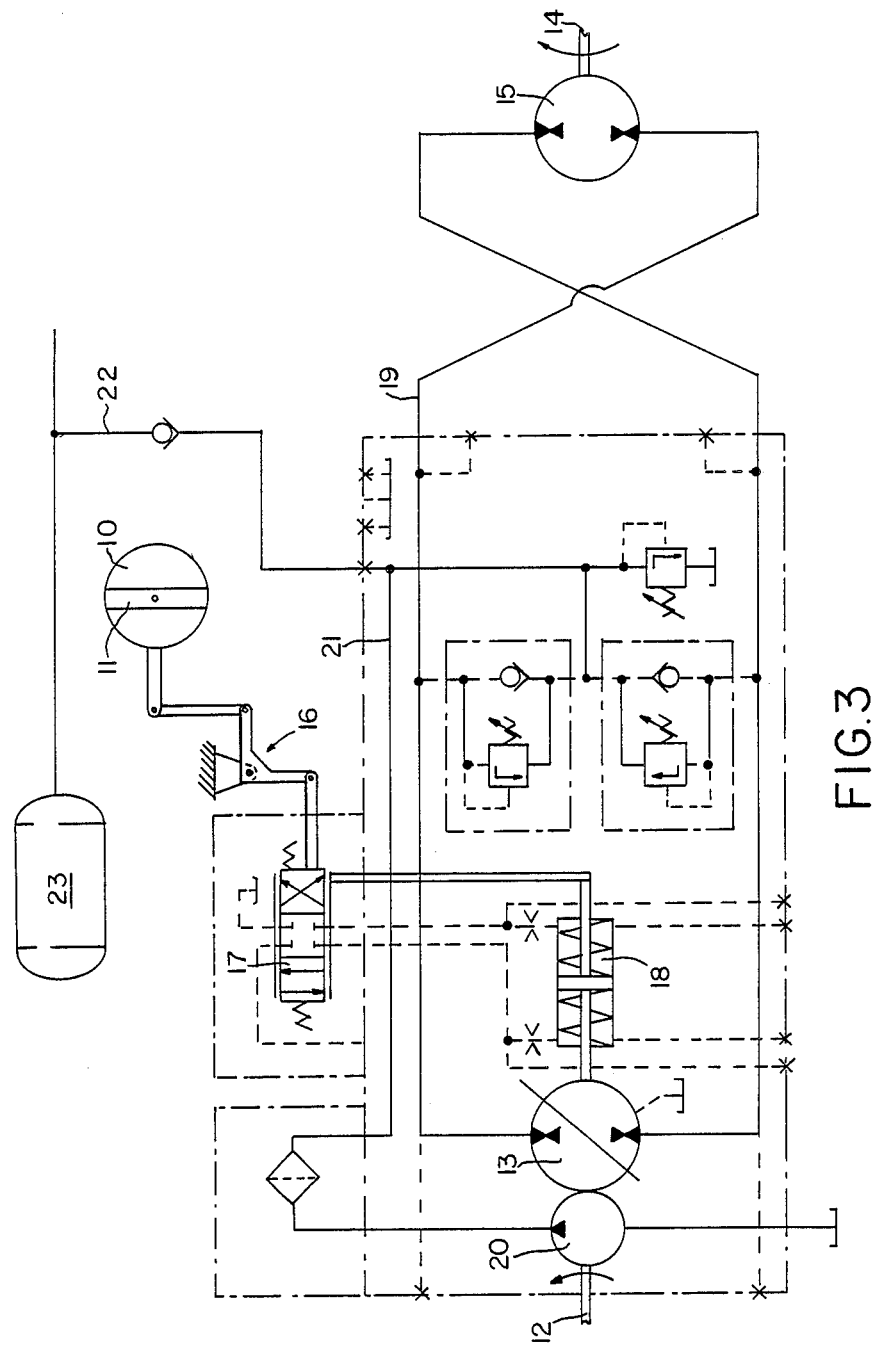

FIG. 3 gives a schematic steering diagram of the apparatus according to the invention.

The apparatus shown in the figures for moving an aircraft comprises a carrier 1, onto which the aircraft 2, schematically represented in FIG. 1 and FIG. 2, can be positioned. The carrier 1 comprises at both sides cater-pillars 3, as well as a carrying platform 4 for the aircraft 2 positioned between these cater-pillars 3.

The carrying platform 4 can pivot around a traverse axis 5 between a first position, in which the leading edge 6 of the carrying platform 4 contacts the ground and a second position, in which the carrying platform extends practically horizontally. If an aircraft 2 has to be positioned onto the carrier 1 this carrying platform 4 is in its first position, in which the leading edge 6 rests on the ground and in which the aircraft 2 can be positioned rearwardly onto the carrying platform 4. For this purpose the carrying platform 4 comprises a winch 7, with which the aircraft is towed onto the carrying platform 4.

The position of the traverse axis 5 of the carrying platform 4 is chosen such, that the center of gravity of the aircraft 2 will pass this traverse axis when the aircraft 2 is towed onto the carrying platform 4. As a result the carrying platform 4 will pivot from its first position towards its second horizontal position, said second position being illustrated in FIG. 2. Hereafter the carrying platform 4 is locked in its horizontal position, whereas the aircraft 2 can be latched relative to the carrying platform 4, for example by means of a chock device 8 near to the main landing gear of the aircraft 2, as represented schematically in fig. 2.

According to another embodiment of the carrier 1 not shown, it is possible, that the aircraft 2 is moved from a raised platform from the backward side of the carrier 1 onto the carrying platform 4, wherein said carrying platform 4 is already in its horizontal position. In this embodiment a winch 7 is not necessary.

If the aircraft 2 is positioned on the carrying platform 4 of the carrier 1 in this way and has been locked, the carrier 1 can be moved by the thrust of the aricraft 2.

For following a curved track the carrier 1 is steerable by the nosewheel 9 of the aircraft 2 positioned on the carrier 1. Therefore the carrier 1 comprises a steering means 10 pivotable by the nosewheel 9 between two extreme positions. This steering means 10 comprises a carousel with a slot 11 for partially housing the nosewheel of the aircraft 2. The steering means 10 controls the r.p.m.-ratio between the cater-pillars 3 positioned at opposite sides of the carrier 1. The operation of this steering by means of the steering means 10 will be explained further with reference to FIG. 3.

In FIG. 3 a shaft 12 is represented, connecting the cater-pillar 3 positioned at one side of the carrier 1 to a first hydraulic motor/pump assembly 13. Moreover a shaft 14 is shown connecting the cater-pillar 3 positioned at the other side of the carrier 1 with a second hydraulic motor/pump assembly 15. The motor/pump assembly 13 has a settable workstroke, wherein the setting is controlled by the position of the steering means 10. The connection between the steering means 10 and the motor/pump assembly 13 is provided by a lever system 16 connected to a reversing valve 17, said valve in its turn by means of a servo mechanism known per se causing the motion of a setting means 18 for setting the workstroke of the motor/pump assembly 13. Moreover the motor/pump assembly 13 is positioned in series with the motor/pump assembly 15 by means of the circuit 19.

In the represented middle position of the steering means 10 the setting of the workstroke of the motor/pump assembly 13 is such, that by each revolution of the shaft 12 the amount of hydraulic fluid circulated by the motor/pump assembly 13 equals the amount of hydraulic fluid circulated by the motor/assembly 15 by each revolution of the shaft 14. For the motor/pump assembly 13 and the motor/pump assembly 15 are positioned in series in the same circuit 19, the amount of hydraulic fluid that circulates through motor/pump assemblies 13 and 15, respectively, has to be equal. In the mentioned middle position of the steering means 10 this means, that the r.p.m. numbers of the shafts 12 and 14 are equal, so that the carrier 1 will move straight forward under influence of the thrust of the aircraft 2.

If now a steering wheel movement is provided to the nosewheel 9 of the aircraft 2 the steering means 10 will rotate and, by means of the lever system 16 and the reversing valve 17, the setting means 18 will be powered, so that the workstroke of the motor/pump assembly 13 changes. If for example the workstroke of the motor/pump assembly 13 is decreased, the amount of hydraulic fluid circulated by the motor/pump assembly 13 with each revolution of the shaft 12 will be smaller than the amount of hydraulic fluid circulated by the motor/pump assembly 15 with each revolution of the shaft 14. But for also in this case the amount of hydraulic fluid circulated by the motor/pump assembly 13 has to be equal to the amount of hydraulic fluid circulated by the motor/pump assembly 15, the motor/pump assembly 13 has to rotate faster relative to the motor/pump assembly 15. This means that the motor/pump assembly 15 is decelerated and that the motor/pump assembly 13 is accelerated. As a result the r.p.m.-ratio between motor/pump assemblies 13 and 15, respectively, is increased, and therefore the r.p.m.-ratio between the cater-pillars 3. On the other hand an increase of the workstroke of the motor/pump assembly 13 will lead to a decrease of the r.p.m.-ratio between the motor/pump assemblies 13 and 15, respectively.

As will be clear, the carrier 1, if the caterpillars 3 rotate with different r.p.m. numbers, will not longer move straight forward, but will follow a curved track, whereas the rolling resistance during following this curved track will be minimized. Hereby the curve radius depends on the r.p.m.-ratio.

As further appears from FIG. 3 the motor/pump assembly 13 is connected to an auxiliary pump 20, that through pipings 21, 22 is connected with a pressure vessel 23. The pressure that is built up in the pressure vessel 23 can be applied for powering several means, such as the locking means 8 and the mechanism for locking the carrying platform 4 in its horizontal position. Furthermore the apparatus can comprise a compressed air vessel not shown, wherein a compressed air motor is provided for driving the apparatus, so that it is possible to move the carrier 1 over a short distance by powering the compressed air motor of the carrier 1 by means of the compressed air vessel 23. By doing so it is not necessary that the aircraft 2 is positioned on the carrier 1.

The invention is not restricted to the embodiment illustrated before, but can be varied widely within the scope of the invention.

I claim:

1. An apparatus for moving an aircraft comprising:
   a carrier with at least two tracks, one of said tracks positioned on a side of said carrier, the other of said tracks positioned the other side of said carrier, said carrier being movable by the thrust of the aircraft positioned on said carrier; and
   a steering means to control the rotations per minute ratio between said at least two tracks, said steering means positioned on said carrier so that said steering means is settable between two extreme positions by the nose wheel of the aircraft.

2. The aircraft according to claim 1 wherein said steering means comprises a carousel with a slot for partially housing the nose wheel of the aicarft.

3. The aircraft according to claim 1 further comprising first and second hydraulic motor pump assemblies wherein said first hydraulic motor pump assembly is connected by a shaft to one of said at least two tracks and said second hydraulic motor pump assembly is connected to the other of said at least two tracks.

4. The apparatus according to claim 3 wherein said first hydraulic motor pump assembly includes a power stroke settable by said steering means and said first hydraulic motor pump assembly is positioned in series with said second hydraulic motor pump assembly.

5. The apparatus according to claim 3 wherein said steering means is connected to said first hydraulic motor pump assembly via a servo mechanism.

6. The apparatus according to claim 1 wherein said steering means is steerable by the nosewheel of the aircraft.

7. The apparatus according to claim 3 wherein one of said hydraulic motor pump assemblies is connected to an auxiliary pump for pressurizing a pressure vessel.

8. The apparatus according to claim 7 wherein said pressure vessel comprises a hydraulic reservoir that is connectable to both of said hydraulic motor pump assemblies.

9. The apparatus according to claim 7 further comprising a compressed air vessel that can be connected to an additional drive motor.

10. The apparatus according to claim 1 wherein said at least two tracks comprise crawler type traction elements.

11. A method for moving an aircraft comprising supporting the aircraft on at least two tracks;
   supporting the aircraft on at least two tracks;
   propelling the aircraft by the thrust of the aircraft;
   providing means to control the rotations per minute ratio between said at least two tracks; and
   steering the aircraft by the pivotable nose wheel on the aircraft wherein the pivotable nose wheel engages said means to control the rotations per minute.

* * * * *